Figure 1:
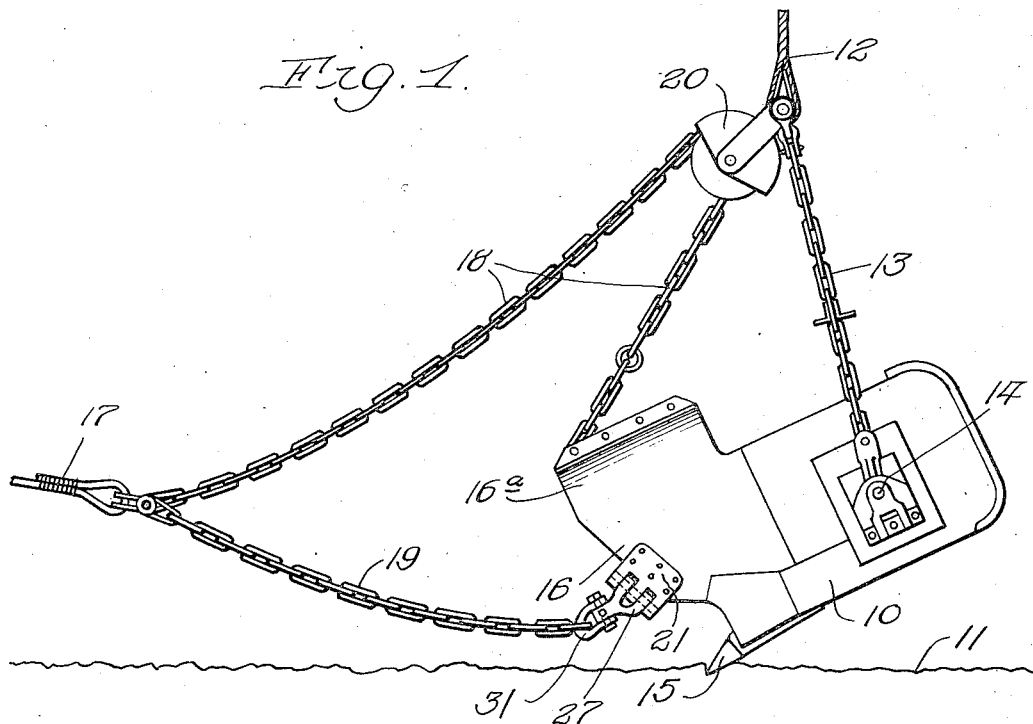

March 3, 1936.    J. W. PAGE    2,032,851
EXCAVATING SHOVEL
Filed March 14, 1935    2 Sheets-Sheet 1

Inventor:
John W. Page

March 3, 1936.   J. W. PAGE   2,032,851
EXCAVATING SHOVEL
Filed March 14, 1935   2 Sheets-Sheet 2
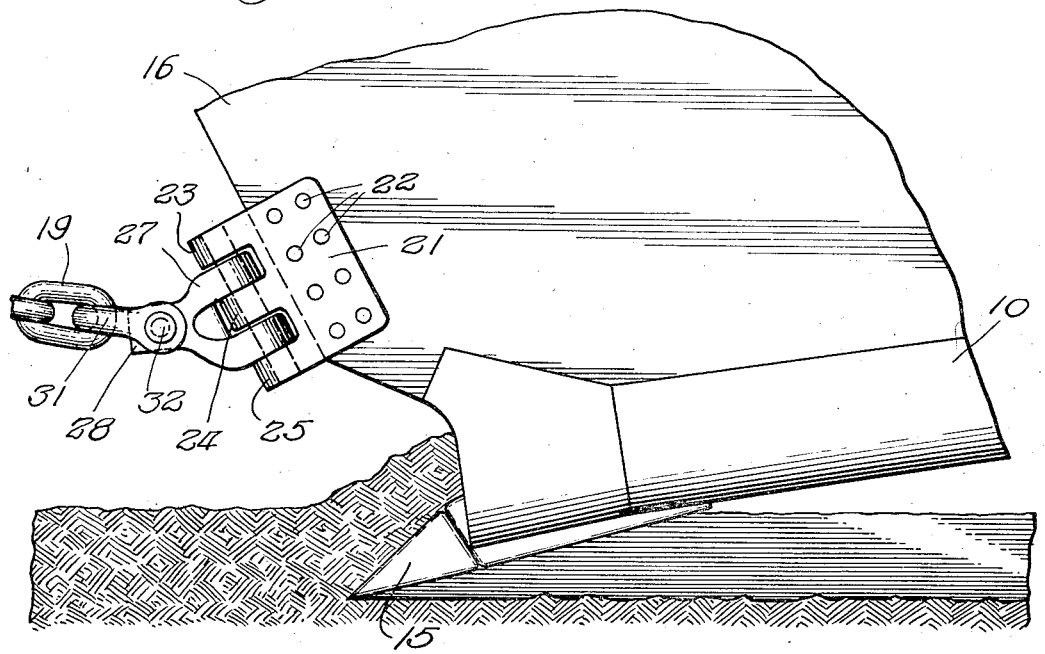
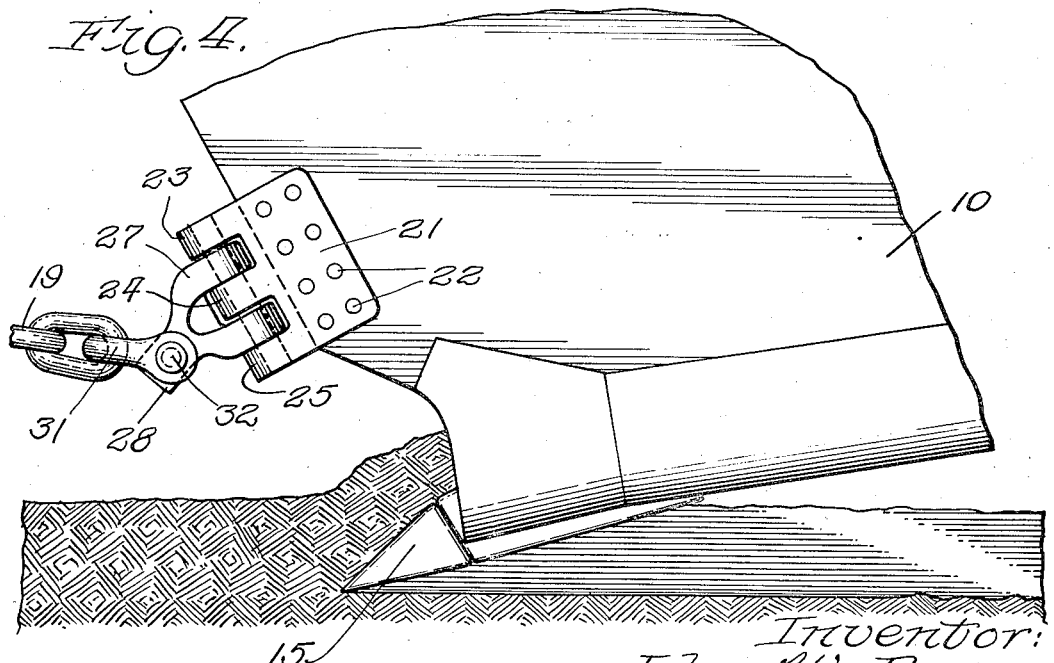
Inventor:
John W. Page,
By Dynenforth, Lee, Chritton & Wiles,
Attys.

Patented Mar. 3, 1936

2,032,851

UNITED STATES PATENT OFFICE 2,032,851

EXCAVATING SHOVEL

John W. Page, Chicago, Ill.

Application March 14, 1935, Serial No. 11,151

8 Claims. (Cl. 37—135)

This invention relates to improvements in excavating shovels or buckets and, more particularly, to that type of shovel shown in my Patent No. 758,380, dated April 26, 1904; my Patent No. 916,772, dated March 30, 1909; and my Patent No. 1,532,775, dated April 7, 1925.

A shovel of the character referred to is provided with a hauling member terminating in a bridle, and means are provided for hitching or attaching each end of the bridle to one side of the shovel.

The hauling member being in the form of a cable, rope or the like, is naturally flexible, and the bridle (usually in the form of chains) which may be considered a part of the hauling member, is also flexible.

The means for hitching the hauling member to the side of the bucket includes a pivotal connection on a horizontal pivot substantially at right angles to the line of pull. The hitching means back of this pivot is rigid in a vertical plane. That is, the bucket and hauling member will have relative angular movement in a vertical plane about this pivot. There may be one or more additional pivots in front of this pivot but these will not be effective because tension on the hauling member will prevent them from operating. In speaking of the pivot (on a horizontal axis) in the connection between the hauling member and the side of the bucket, it is to be understood, therefore, that I refer to the rearmost pivot; that is, the one back of which the connection is rigid in a vertical plane.

I have found that by moving this pivot point forwardly or backwardly, operation of the shovel can be varied. For example, as this pivot point is adjusted forwardly, the longer leverage provided on the bucket causes it to dig less deeply. Moving the pivot rearwardly causes the shovel to dig more deeply.

The principal feature of my invention is the provision of means for hitching the hauling member to each side of the shovel, said means including mechanism by which such pivot, on each side of the bucket, can be readily adjusted forwardly or backwardly. This construction enables the operator to change the operation of the shovel and adapt it to different conditions and kinds of material.

Another feature of my invention is the provision of mechanism in the hitch means for vertically adjusting the pivot point. I have found that vertical adjustment of this pivot will vary the speed with which the shovel will roll back into position to take its load. As is well known, after dumping, the shovel is lowered to the ground where it rests more or less on its teeth with the front end pointing downwardly. As the hauling member is tightened, it rolls back into position to take its load. I have found that by raising the pivot point (considering the shovel in its horizontal position) the speed with which it thus rolls back is lessened. Lowering the pivot increases the speed with which the shovel will chop down to its excavating position.

Other features and advantages of my invention will appear more fully as I proceed with my specification.

In that form of device embodying the features of my invention shown in the accompanying drawings—

Figure 2:
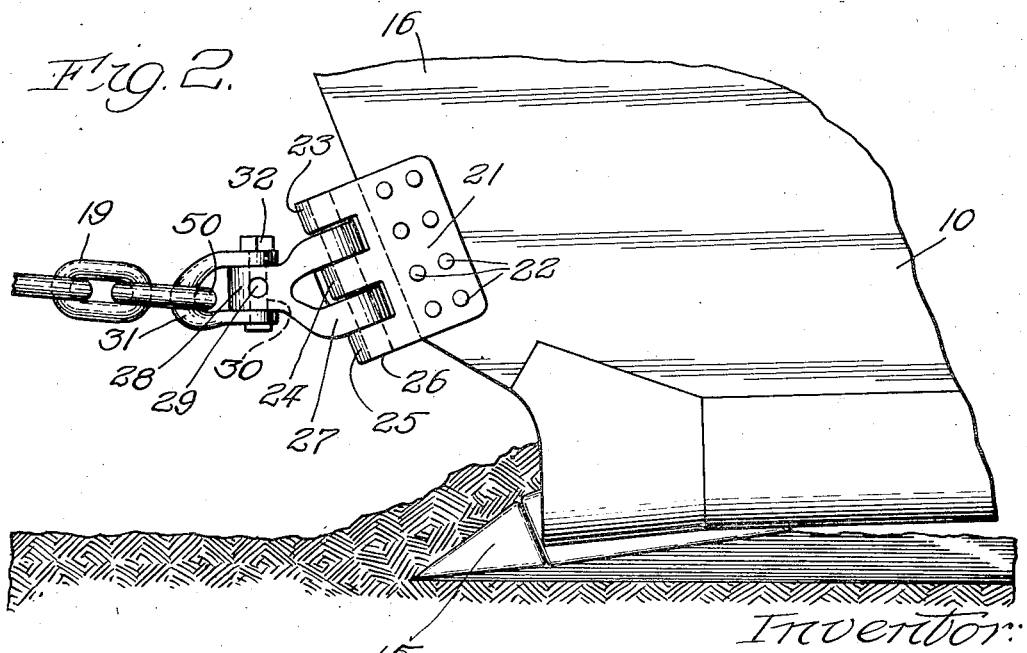

Figure 1 is a view in side elevation; Fig. 2 is a similar fragmentary view on an enlarged scale showing particularly the means for hitching the hauling member to the side of the shovel; Fig. 3 is a view similar to Fig. 2 showing the pivot point adjusted rearwardly, and Fig. 4 is a view similar to Fig. 3, showing the pivot point adjusted rearwardly and downwardly.

Referring to Fig. 1, the shovel 10 is shown upon its first engagement with the ground 11 as a result of the supporting means or lifting cable 12 being lowered. Chains 13 connect the supporting means 12 to the shovel 10 behind the center of gravity of said shovel, so that when released, the shovel will swing down and dump its contents, as is particularly set forth in Patent No. 758,380, granted April 26, 1904, referred to above. The pivotal connections between the lower ends of the chains 13 and the shovel 10 are indicated by the reference numeral 14. The front edge of the bottom of the shovel is provided with a cutting edge or cutting teeth 15. The sides of the shovel, indicated at 16, project slightly forward of the cutting edge 15 when the shovel 10 is in a horizontal position.

The hauling member 17 is shown, said hauling member terminating in and including bridle chains 19. The holding chain 18 runs over a block 20, which block is attached to the supporting means 12. The other end of the holding chain, after having passed over said block, is attached to the upper part of the arch 16ª. The bridle chains 19 are attached to the forward part of the sides 16, by means to be described. The shovel disclosed and claimed herein differs from the shovels shown in the patents above referred to in the construction, arrangement and operation of the means by which the hauling chains 19 are attached to the sides 16. These parts will be described more in detail hereinafter.

In general, my shovel works the same as the shovel of the patents above referred to, each one of the parts doing all that is done by the corresponding parts of the shovels of said patents. Thus, when it is desired to excavate with my shovel, the hauling rope or cable 17 can be drawn in by a suitable engine, and the shovel will fill itself with earth in the ordinary way. Thereupon the shovel can be raised by a derrick, if desired, and it will be maintained in a horizontal position as long as tension is maintained on the hauling cable 17. As the shovel is lifted, it is held in horizontal position as long as the hauling cable 17 is held taut, the force for holding the shovel horizontal at times passing through the holding chains 18 and at times through the hauling chains 19. As soon as the tension on the hauling cable 17 is released, therefore, the means for holding the shovel in a horizontal position is released and its own weight swings it down so as to dump its contents.

It will be noted that when the shovel is dropped to commence its digging cycle, it will assume approximately the position illustrated in Fig. 1. Pulling in the hauling cable 17 will then, through the medium of the hauling chains 19, pull the shovel along and will cause it to fill with earth.

Referring more particularly to Figs. 2, 3 and 4, the side 16 of the shovel is shown provided with a hitch-plate 21, which plate is here shown attached to the side by rivets 22. The plate 21 has at its forward edge hinge-members 23, 24 and 25, which hinge-members are adapted to receive a hinge-pin 26. The hinge-pin 26 is so constructed as to be readily removable from the hinge-members. An extension member 27 is so constructed as to embrace the hinge-pin 26 between the hinge-members 23, 24 and 25. The extension member 27 has a head portion 28 at the forward part thereof, which head portion is located off-center vertically with respect to the center of the extension member 27. The head portion is provided with a substantially horizontal opening 29 therethrough, and with an opening 30 substantially vertically therethrough. A clevis 31 is attached to the hauling chain 19, and is provided with a clevis pin 32 adapted to be received by one of the openings 29 or 30 mentioned above.

In the arrangement shown in Fig. 2, the extension member 27 is shown with its head 28 in the upper position, and the clevis 31 is shown with the pin 32 in the vertical opening 30. In this particular arrangement the pivot (on a horizontal axis) in the means connecting the hauling member to the side of the bucket, is located at the point at which the chain 19 engages the clevis 31, as indicated by 50, and is in its most upward and forward position with respect to the cutting edge 15. The arrangement here illustrated will result in the bucket taking a comparatively shallow cut in the earth 11, and in its being rather slow to drop down off of its teeth and take the digging load when the hauling cable 17 is drawn in.

In the arrangement shown in Fig. 3, the extension member 27 is still shown in its upper position. The clevis 31, however, is here shown with the pin 32 in the horizontal hole 29. This arrangement will insure a deeper cut by the shovel 10. Since the pivot is still in its upper position with respect to the cutting edge 15, however, the bucket will still be rather slow to drop off of its cutting edge 15 and to take the digging load.

In the arrangement shown in Fig. 4, the extension member 27 has been reversed so that its head 28 is now in its lower position. The pin 32 is here shown as still in its horizontal position. The pivot is now in its rearmost and lower position, and the shovel 10 will take a deep cut and will rather quickly drop off its cutting edge 15 and take the digging load resulting from the pulling of the hauling-cable 17.

Inasmuch as the hinge-pin 26 and the clevis pin 32 are both readily removable, any of the arrangements illustrated and described herein may be readily and quickly effected as the type of earth varies, or in accordance with the depth of the cut desired. Although the attachment of the hauling chains 19 to the sides 16 has been described and illustrated as though there were but one chain and one point of connection, it is to be understood that in the commercial shovel there would be a hauling chain connected to each side of the shovel 10, and that such chains would both connect to the hauling cable 17. Any change in the connecting arrangement between the hauling chain and the side of the bucket would, therefore, have to be duplicated in the arrangement of the connecting means whereby the other chain is attached to the other side of the shovel.

It will be seen that with the pivot point at 50, as shown in Fig. 2, the means hitching the hauling member 19 to the side of the bucket 16 is rigid in a vertical plane back of this pivot point 50. With the pivot point at 32, as shown in Figs. 3 and 4, the hitching means is rigid in a vertical plane back of such pivot point 32.

The horizontal pivotal axis 50 (as shown in Fig. 2) or the horizontal pivotal axis 32 (as shown in Figs. 3 and 4) may, in each case, be considered as the effective point of pull. When so considered, the effective point of pull of the hauling member is moved backwardly by the adjustment of Fig. 3, and backwardly and downwardly by the adjustment of Fig. 4.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inhererent in my invention as broadly as permissible, in view of the prior art.

What I claim as new, and desire to secure by Letters Patent, is:

1. In combination with a shovel of the character described, means for hitching a hauling member to the side thereof, said means including a member attached to the side of the shovel and provided with a vertical hole and a horizontal hole, and a clevis attached to the hauling member, said clevis having a pin adapted for insertion into either hole, whereby, when the clevis pin is inserted into the vertical hole the horizontal pivot in the connection between the hauling member and the side of the bucket is moved forwardly.

2. Apparatus of the character described, including; a shovel having a cutting edge and a forward portion projecting beyond said cutting edge; hauling means; a clevis attached to said hauling means; means for pivotally connecting said clevis to said forward portion with the axis of the clevis pin substantially horizontal with respect to said shovel; and means for pivotally connecting said clevis to said forward portion with the axis of the clevis pin substantially vertical with respect to said shovel, whereby the effective point of pull of said hauling means may be changed.

3. Apparatus of the character described, including; a shovel having a cutting edge and a forward portion projecting beyond said cutting edge; an extension member attached to said forward portion; hauling means; a clevis attached to said hauling means; means for pivotally connecting said clevis to said extension member with the axis of the clevis pin substantially horizontal with respect to said shovel; and means for pivotally connecting said clevis to said extension member with the axis of the clevis pin substantially vertical with respect to said shovel, whereby the effective point of pull of said hauling means may be changed.

4. Apparatus of the character described, including; a shovel having a cutting edge and sides, said sides projecting forward of said cutting edge; supporting means for said shovel, said means being pivoted thereto behind the center of gravity thereof; an extension member mounted on one of said sides; hauling means; a clevis attached to said hauling means; means for pivotally connecting said clevis to said extension member with the axis of the clevis pin substantially horizontal with respect to said shovel; and means for pivotally connecting said clevis to said extension member with the axis of the clevis pin substantially vertical with respect to said shovel, whereby the effective point of pull of said hauling means may be changed.

5. Apparatus of the character described, including; a shovel having a cutting edge and sides, said sides projecting forward of said cutting edge; supporting means for said shovel, said means being pivoted thereto behind the center of gravity thereof; an extension member pivotally mounted on one of said sides, the forward portion of said member having an upper position and a lower position; hauling means; a clevis attached to said hauling means; means for pivotally connecting said clevis to the forward portion of said extension member with the axis of the clevis pin substantially horizontal with respect to said shovel; and means for pivotally connecting said clevis to said extension member with the axis of the clevis pin substantially vertical with respect to said shovel, whereby the effective point of pull of said hauling means may be changed.

6. Apparatus of the character described, including; a shovel having a cutting edge and sides, said sides projecting forward of said cutting edge; supporting means for said shovel, said means being pivoted thereto behind the center of gravity thereof; an extension member removably mounted on one of said sides, the forward portion of said member having an upper position and a lower position, said forward portion having a substantially vertical opening therethrough and a substantially horizontal opening therethrough; hauling means; a clevis attached to said hauling means; and a clevis pin adapted to be received by one of said openings, whereby said hitching member is connected to said extension member.

7. Apparatus as claimed in claim 6, in which the extension member is mounted on the side on a substantially vertical pivot.

8. In combination with a shovel of the character described; a hauling member; a clevis carried by the hauling member; a pin carried by the clevis; an extension member with its outer end located off center vertically and provided with a horizontal hole and a vertical hole, the pin of the clevis adapted for insertion into either hole; and means for attaching said extension member to the side of the shovel in upright or inverted position.

JOHN W. PAGE.